(12) United States Patent
Bailly et al.

(10) Patent No.: US 8,262,530 B2
(45) Date of Patent: Sep. 11, 2012

(54) POWER-BRANCHED TRANSMISSION

(75) Inventors: Gerhard Bailly, Friedrichshafen (DE);
Thomas Ratzmann, Meckenbeuren (DE); Walter Fischer, Friedrichshafen (DE); Jurgen Pohlenz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 319 days.

(21) Appl. No.: 12/679,511

(22) PCT Filed: Aug. 15, 2008

(86) PCT No.: PCT/EP2008/060756
§ 371 (c)(1),
(2), (4) Date: Mar. 23, 2010

(87) PCT Pub. No.: WO2009/047034
PCT Pub. Date: Apr. 16, 2009

(65) Prior Publication Data
US 2010/0204000 A1    Aug. 12, 2010

(30) Foreign Application Priority Data
Oct. 2, 2007  (DE) .......................... 10 2007 047 194
Jul. 16, 2008  (DE) .......................... 10 2008 040 444

(51) Int. Cl.
F16H 37/02   (2006.01)
F16H 47/04   (2006.01)
(52) U.S. Cl. ......................................... 475/217; 475/72
(58) Field of Classification Search .................. 475/214, 475/5
See application file for complete search history.

(56) References Cited

U.S. PATENT DOCUMENTS

| | | | |
|---|---|---|---|
| 2,583,656 A | 1/1952 | Lay |
| 2,808,737 A | 10/1957 | Bullard, III |
| 3,023,638 A | 3/1962 | Westbury et al. |
| 3,204,486 A | 9/1965 | Lalio |
| 3,212,358 A | 10/1965 | Lalio |
| 3,580,107 A | 5/1971 | Orshansky, Jr. |
| 3,601,981 A | 8/1971 | Ifield |
| 3,626,787 A | 12/1971 | Singer |
| 3,714,845 A | 2/1973 | Mooney, Jr. |
| 3,834,164 A | 9/1974 | Ritter |
| 4,019,404 A | 4/1977 | Schauer |
| 4,121,479 A | 10/1978 | Schauer |
| 4,434,681 A | 3/1984 | Friedrich et al. |
| 4,446,756 A | 5/1984 | Hagin et al. |
| 4,563,914 A | 1/1986 | Miller |
| 4,776,233 A | 10/1988 | Kita et al. |
| 4,813,306 A | 3/1989 | Kita et al. |
| 4,976,664 A | 12/1990 | Hagin et al. |
| 5,071,391 A | 12/1991 | Kita |
| 5,421,790 A | 6/1995 | Lasoen |
| 5,643,122 A | 7/1997 | Fredriksen |
| 5,667,452 A | 9/1997 | Coutant |
| 5,766,107 A | 6/1998 | Englisch |

(Continued)

FOREIGN PATENT DOCUMENTS

AT    197 650 B    10/1957
(Continued)

*Primary Examiner* — Roger Pang
*Assistant Examiner* — Stacey Fluhart
(74) *Attorney, Agent, or Firm* — Davis & Bujold, P.L.L.C.

(57) ABSTRACT

A power-branched transmission for an agricultural vehicle is configured as a power-branched transmission having a secondary coupling. The transmission comprises a summation planetary gear set (5), the planetary gear of which are configured as a double planetary gear (8).

17 Claims, 3 Drawing Sheets

U.S. PATENT DOCUMENTS

| | | | |
|---|---|---|---|
| 5,868,640 | A | 2/1999 | Coutant |
| 5,890,981 | A | 4/1999 | Coutant et al. |
| 6,029,542 | A | 2/2000 | Wontner |
| 6,056,661 | A | 5/2000 | Schmidt |
| 6,210,298 | B1 * | 4/2001 | Baur et al. ............ 475/211 |
| 6,485,387 | B1 | 11/2002 | Goodnight et al. |
| 6,592,485 | B2 | 7/2003 | Otten et al. |
| 6,761,658 | B1 | 7/2004 | Stettler, Jr. |
| 7,097,583 | B2 | 8/2006 | Lauinger et al. |
| 7,354,368 | B2 | 4/2008 | Pollman |
| 7,448,976 | B2 | 11/2008 | Hiraki et al. |
| 2002/0042319 | A1 | 4/2002 | Otten et al. |
| 2003/0089107 | A1 | 5/2003 | Tani |
| 2003/0150662 | A1 | 8/2003 | Tani |
| 2003/0166430 | A1 | 9/2003 | Folsom et al. |
| 2004/0043856 | A1 * | 3/2004 | Xiaolan ............ 475/5 |
| 2004/0242357 | A1 | 12/2004 | Ishizaki |
| 2006/0094554 | A1 | 5/2006 | Schmidt |
| 2006/0111212 | A9 * | 5/2006 | Ai et al. ............ 475/5 |
| 2006/0276291 | A1 | 12/2006 | Fabry et al. |
| 2007/0277520 | A1 | 12/2007 | Gollner |
| 2007/0281815 | A1 | 12/2007 | Gollner |
| 2008/0085801 | A1 | 4/2008 | Sedoni et al. |
| 2008/0103006 | A1 | 5/2008 | Pollman et al. |
| 2008/0214349 | A1 | 9/2008 | Liebherr et al. |
| 2008/0214351 | A1 | 9/2008 | Katayama et al. |
| 2009/0270212 | A1 | 10/2009 | Ueda et al. |
| 2010/0056318 | A1 | 3/2010 | Glockler |
| 2010/0144482 | A1 * | 6/2010 | Winter ............ 475/210 |
| 2010/0204000 | A1 * | 8/2010 | Bailly et al. ............ 475/248 |

FOREIGN PATENT DOCUMENTS

| | | | |
|---|---|---|---|
| DE | 1 069 978 | | 11/1959 |
| DE | 976 055 | | 1/1963 |
| DE | 1 174 126 | | 7/1964 |
| DE | 1 952 966 | | 4/1970 |
| DE | 27 57 399 | A1 | 9/1978 |
| DE | 28 54 375 | A1 | 6/1980 |
| DE | 29 04 572 | A1 | 8/1980 |
| DE | 28 44 116 | A1 | 7/1982 |
| DE | 80 18 579 | U1 | 6/1984 |
| DE | 36 22 045 | A1 | 3/1987 |
| DE | 42 06 023 | A1 | 9/1993 |
| DE | 94 02 493 | U1 | 7/1995 |
| DE | 44 43 267 | A1 | 6/1996 |
| DE | 197 51 993 | A1 | 5/1998 |
| DE | 198 43 069 | A1 | 5/1999 |
| DE | 100 03 174 | A1 | 9/2000 |
| DE | 199 54 894 | A1 | 12/2000 |
| DE | 100 47 398 | A1 | 4/2002 |
| DE | 202 08 495 | U1 | 1/2003 |
| DE | 601 03 717 | T2 | 10/2004 |
| DE | 103 19 252 | A1 | 11/2004 |
| DE | 10 2006 004 223 | A1 | 8/2006 |
| DE | 10 2006 025 347 | B3 | 12/2007 |
| DE | 10 2006 025 348 | A1 | 12/2007 |
| DE | 11 2004 000 874 | B4 | 4/2008 |
| DE | 10 2007 049 412 | A1 | 5/2008 |
| EP | 0 234 135 | A1 | 9/1987 |
| EP | 0 234 136 | A1 | 9/1987 |
| EP | 0 235 466 | A1 | 9/1987 |
| EP | 0 465 752 | A1 | 1/1992 |
| EP | 0 577 282 | A1 | 1/1994 |
| EP | 0 683 875 | B1 | 4/1998 |
| EP | 1 541 898 | A2 | 6/2005 |
| EP | 1 855 029 | A2 | 11/2007 |
| EP | 1 930 627 | A1 | 6/2008 |
| EP | WO2009/130084 | * | 10/2009 |
| FR | 1197 751 | A | 1/1958 |
| FR | 1 483 053 | | 5/1966 |
| GB | 1 206 196 | | 9/1970 |
| JP | 2007-85517 | A | 4/2007 |
| WO | 86/00963 | A1 | 2/1986 |
| WO | 99/15813 | A3 | 4/1999 |
| WO | 00/43695 | A3 | 7/2000 |
| WO | 2004/038257 | A1 | 5/2004 |
| WO | 2004/072512 | A1 | 8/2004 |
| WO | 2006/042434 | A1 | 4/2006 |
| WO | 2007/014706 | A1 | 2/2007 |
| WO | 2008/004360 | A1 | 1/2008 |

* cited by examiner

POWER-BRANCHED TRANSMISSION

This application is a National Stage completion of PCT/EP2008/060756 filed Aug. 15, 2008, which claims priority from German patent application serial no. 10 2007 047 194.9 filed Oct. 2, 2007 and German patent application serial no. 10 2008 040 444.6 filed Jul. 16, 2008.

FIELD OF THE INVENTION

The present invention relates to a power-branched transmission.

BACKGROUND OF THE INVENTION

Generic power-branched transmissions are used in work machines or agricultural machines, such as tractors, in which the external shape of the transmission has to be long and slender.

A power-branched transmission that has a variator configured as a hydrostatic device is known from DE 10 2006 025 348 A1. The power-branched transmission is equipped with a power splitting planetary gear set, wherein a shaft of the planetary gear set is operatively connected to a first shaft of the variator and drives a variable displacement pump by means of it. Another shaft of the planetary gear set is connected via a gear stage to another shaft of the variator, which in turn is operatively connected to the hydraulic motor of the variator. The third shaft of the planetary gear set is connected to a transmission input of the power-branched transmission, which is connected to a drive mechanism. In addition, the second shaft of the variator is configured with a plurality of fixed gears, which mesh with a plurality of idler gears that are arranged on a countershaft, wherein the idler gears can be connected, via shift elements, to the countershaft in a rotationally fixed manner for implementing different drive modes and/or transmission ranges for forward driving and at least one drive mode for reverse driving.

Disadvantageously, the changes between drive modes cannot be carried out synchronously, so that power shifting with simultaneous correction of the transmission ratio in the region of the hydrostatic device has to be carried out in order to avoid interruption of the torque flow at any rate when changing a drive mode. During such shifts, disturbing reaction torques occur in the drive train that can be perceived as a jerk by the operator during operation.

SUMMARY OF THE INVENTION

The underlying object of the present invention is to create a power-branched transmission which can be used in a work machine or agricultural vehicle, such as a tractor, which has a simple design and by means of which synchronous drive mode changes can be carried out.

This object is attained by a generic power-branched transmission that also has the characteristic features described in the main claim.

The power-branched transmission has an input shaft, which can be driven by a drive motor, for example an internal combustion engine. A summation planetary gear set is connected to the input shaft on one hand and to a variator on the other hand. The summation planetary gear set has a planet carrier, at least one sun gear and a ring gear. The planet carrier is operatively connected to the input shaft via a spur gear. The variator has a first and a second shaft, wherein the first shaft is connected to the sun gear of the summation planetary gear set in a rotationally fixed manner, and the second shaft is operatively connected to the ring gear of the summation planetary gear set via a spur gear. The variator preferably comprises a hydrostatic pump and a hydrostatic motor, wherein the hydrostatic motor and the hydrostatic pump can be configured as bent-axis drive units and the displacement volume can be adjusted by means of a common double yoke. This hydrostatic variator may, for example, be implemented like the variator of DE 10 2006 025 347 B3.

The axis of rotation of the sun gear of the summation planetary gear set is arranged parallel to the input shaft, the axes of rotation of the first and second shafts of the variator are likewise parallel, and an output shaft of the transmission, which is connected to a drive axle that drives the drive wheels, is likewise parallel to the input shaft. The input shaft, the sun gear and the output shaft are spaced apart from one another. The summation planetary gear set has a double planetary gear, by means of which the stationary transmission ratio of the planetary gear set can be expanded such that the radial installation space available for the transmission is maintained. Thus, it is possible to create a slender transmission in the radial direction. The ring gear of the double planetary gear set can be connected, via a shift device, to a first spur gear, by means of which the output shaft can be driven, and via a shift device to a second spur gear, by means of which the output shaft can be driven. A sun gear of the summation planetary gear set can be connected, via a shift device, to a third spur gear that drives the input shaft, and, via a shift device, to a fourth spur gear that drives the output shaft. The shift devices are thus arranged downstream of the summation planetary gear set. The power-branched transmission is thus configured as an infinitely variable power-branched transmission comprising a secondary coupling.

In another embodiment of the present invention, the summation planetary gear set has two sun gears, one sun gear meshing with a first planetary gear of the double planetary gear and the second sun gear with the second planetary gear of the double planetary gear. The first sun gear is connected to the variator, and the second sun gear is connected to the output shaft by means of the shift device either via the third or fourth spur gear. The ring gear can either mesh with one planetary gear of the double planetary gear or with the other planetary gear of the double planetary gear. This way, additional degrees of freedom are available for the design, which allow for adaptation to the special use of the vehicles. Different transmission ratios are shifted by way of the shift devices within which the transmission ratio can be infinitely varied using the variator. The power-branched transmission can be started from a standstill, as a result of which the strain on the variator is reduced in a very simple way compared to the transmission devices known from practice, where a starting torque is completely conducted over the variator when starting a work machine.

In another advantageous embodiment of the transmission device according to the invention, a reversal of the direction of rotation between the transmission input and the transmission output can be implemented by means of a valve device of the hydrostatic circuit of the variator, via which a delivery unit can be switched in the hydraulic circuit.

BRIEF DESCRIPTION OF THE DRAWINGS

Further characteristics will be apparent form the description of the drawings. The drawings show.

DETAILED DESCRIPTION OF THE PREFERRED EMBODIMENTS

FIG. 1

Figure 1:
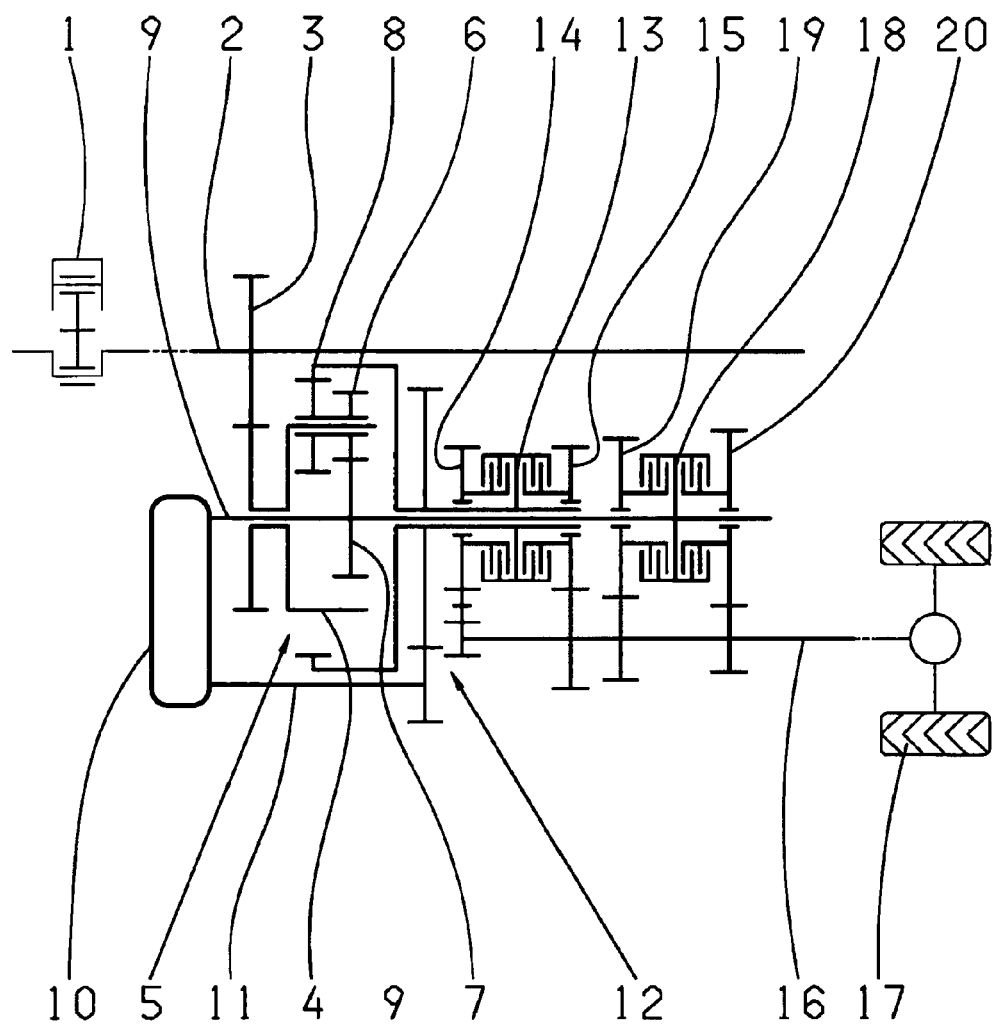
FIG. 1 a transmission diagram of the power-branched transmission, wherein the summation planetary gear set has a sun gear.

A drive engine 1 drives an input shaft 2 which drives the planet carrier 4 of a summation planetary gear set 5 via a spur gear 3. At least one double planetary gear 6 is mounted on the planet carrier 4 and is operatively connected to a sun gear 7 and a ring gear 8. The sun gear 7 is connected to a first shaft 9 of a variator 10 in a rotationally fixed manner. The variator 10 is preferably configured as a hydraulic module having two integrated swash plate or bent-axis drive units comprising a double yoke, as disclosed in DE 10 2006 025 347 B3. It is also possible to use two separate adjusting units in a bent-axis or swash plate design. It is, however, also possible to configure the variator as an electric variator, comprising an electric generator and an electric motor. The second shaft 11 of the variator is operatively connected to the ring gear 8 via a spur gear 12. The ring gear 8 is connected in a rotationally fixed manner to a shift device 12, by which the ring gear 8 can be connected to the output shaft 16 either via a first spur gear 14 or a second spur gear 15. The output shaft 16 drives a drive axle 17. The sun gear 7 is connected in a rotationally fixed manner to a shift device 18, by which the sun gear 7 can be connected to the output shaft 16 either via a third spur gear 19, or via a fourth spur gear 20. The spur gears 14, 15, 19 and 20 as well as the shift devices 13 and 18 are arranged downstream of the summation planetary gear set 5. The output shaft 16, the input shaft 2 as well as the sun gear shaft and/or first shaft 9 are arranged spaced apart and parallel to one another. By using a double planetary gear 8 in the summation planetary gear set 5, the distance among the shafts 2, 9 and 16 can be reduced such that the transmission can be used in a tractor.

FIG. 2

This differs from FIG. 1 in that the summation planetary gear set 5 has a first sun gear 21 and a second sun gear 22, the first sun gear 21 being connected in a rotationally fixed manner to the first shaft 9 and operatively connected to the double planetary gear 6, and the second sun gear 22 being connected in a rotationally fixed manner to the shift device 13, and operatively connected to the double planetary gear 6. The ring gear 8 is operatively connected to the planetary gear of the double planetary gear 6 which has the smaller diameter.

FIG. 3

Figure 2:
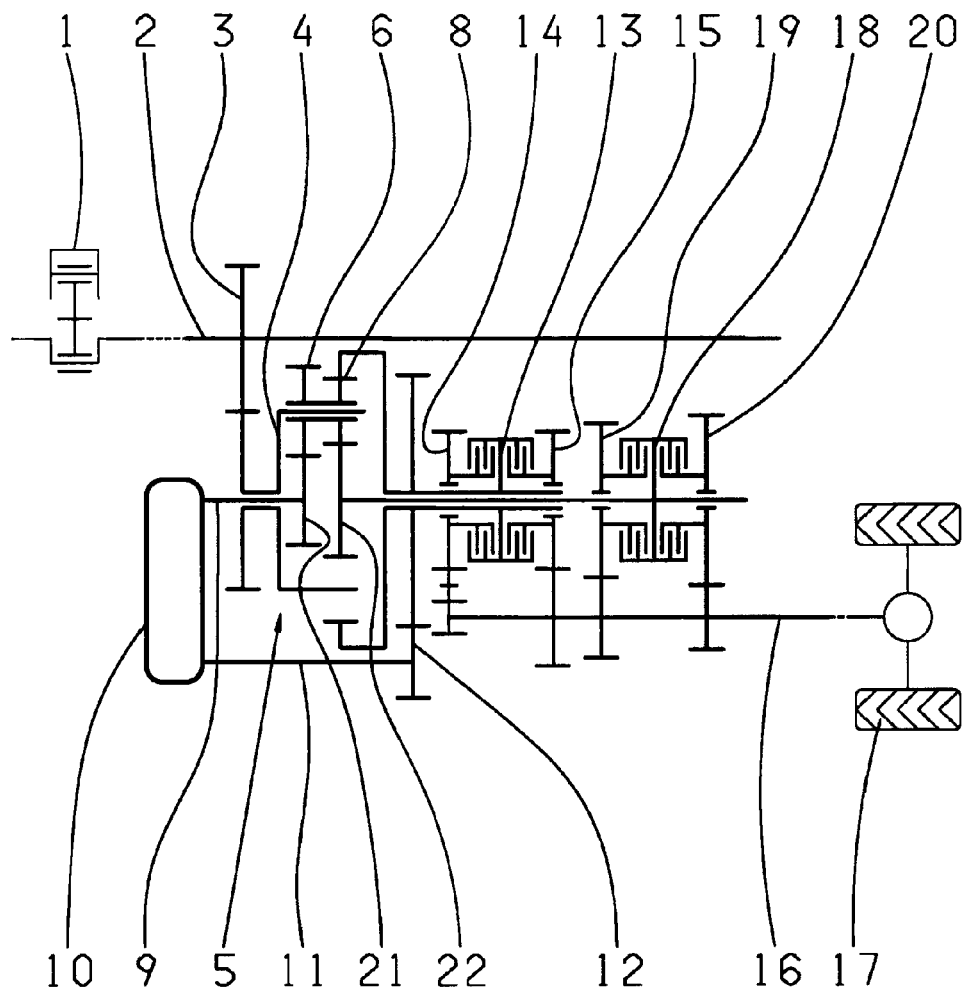
FIG. 2 a transmission diagram of the power-branched transmission, wherein the summation planetary gear set has two sun gears, and the ring gear is operatively connected to the first planetary wheel.
Figure 3:
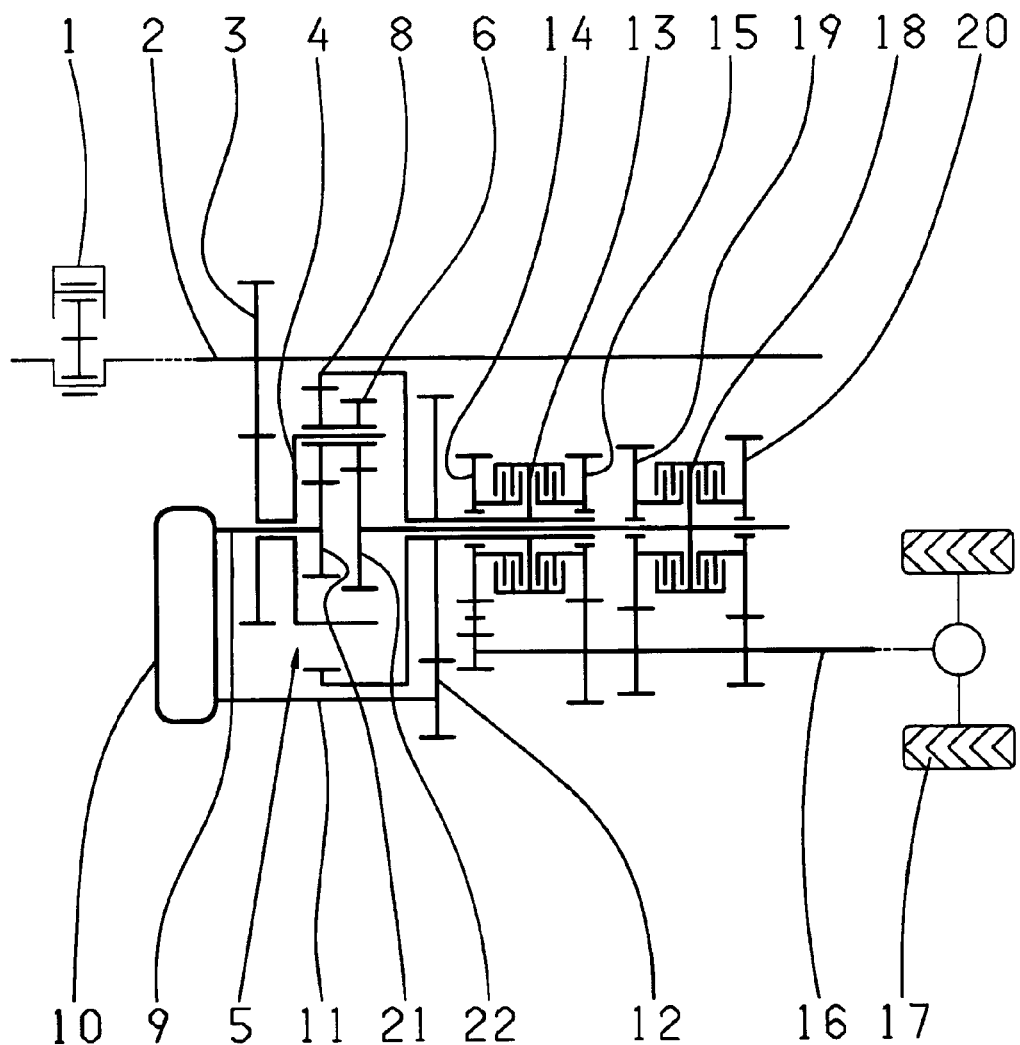
FIG. 3 a transmission diagram of the power-branched transmission, wherein the summation planetary gear set has two sun gears, and the ring gear is operatively connected to the second planetary gear.

The difference here in comparison to FIG. 2 is that the ring gear 8 is operatively connected to the double planetary gear 6 which has the larger diameter.

Reference Numerals 1 drive engine
2 input shaft
3 spur gear
4 planet carrier
5 summation planetary gear set
6 double planetary gear
7 sun gear
8 ring gear
9 first shaft
10 variator
11 second shaft
12 spur gear
13 shift device
14 first spur gear
15 second spur gear
16 output shaft
17 drive axle
18 shift device
19 third spur gear
20 fourth spur gear
21 first sun gear
22 second sun gear

The invention claimed is:

1. A power-branched transmission comprising:
an input shaft (2) being driven by a drive motor (1),
a summation planetary gear set (5) having only a single ring gear (8) and at least one sun gear (7, 21, 22),
the summation planetary gear set (5) having a double planetary gear (6),
an axis of rotation of the sun gear (7, 21, 22) being spaced from an axis of rotation of the input shaft (2),
an infinitely adjustable variator (10) having a first shaft (9) and a second shaft (11),
the first shaft (9) being connected, in a rotationally fixed manner, to the sun gear (7, 21) and the second shaft (11) being operatively connected to the ring gear (8) via a spur gear (12),
the sun gear (7, 22) being connectable to an output shaft (16) via at least a first shift element (18), and
the ring gear (8) being connectable to the output shaft (16) via direct connection to at least a second shift element (13).

2. The power-branched transmission according to claim 1, wherein the ring gear (8) is connectable by the second shift element (13) to the output shaft (16) via a first spur gear (14), and the ring gear (8) is connectable by the second shift element (13) to the output shaft (16) via a second spur gear (15).

3. The power-branched transmission according to claim 2, wherein the sun gear (7, 22) is connectable by the first shift element (18) to the output shaft (16) via a third spur gear (19), and the sun gear (7, 22) is connectable by the first shift element (18) to the output shaft (16) via a fourth spur gear (20).

4. The power-branched transmission according to claim 3, wherein spur wheels of the first spur gear (14), the second spur gear(15),the third spur gear (19) and the fourth spur gear (20) which are connected to one of the first and the second shift elements (13, 18), are coaxially aligned with respect to the axis of rotation of the sun gear (7, 22) while other spur wheels of the first, the second, the third and the fourth spur gears (14, 15, 19, 20) are coaxially aligned with the output shaft (16).

5. The power-branched transmission according to claim 1, wherein the output shaft (16) is spaced from the input shaft (2).

6. The power-branched transmission according to claim 1, wherein the axes of rotation of the input shaft (2), the output shaft (16) and the sun gear shaft (7, 22) are parallel to one another.

7. The power-branched transmission according to claim 1, wherein the variator (10) is a hydrostatic variator which comprises bent-axis drive trains and a double yoke.

8. The power-branched transmission according to claim 1, wherein the power-branched transmission is incorporated into an agricultural vehicle.

9. The power-branched transmission according to claim 1, wherein the summation planetary gear set (5) has only a single sun gear (7, 21, 22).

10. The power-branched transmission according to claim 1, wherein the summation planetary gear set (5) has exactly two sun gears (7, 21, 22).

11. The power-branched transmission according to claim 1, wherein the second shaft (11) is connected, in a rotationally fixed manner, to the spur gear (12), and the spur gear (12) directly rotationally engages with the ring gear (8).

12. A power-branched transmission comprising:
- an input shaft (2) being driven by a drive motor (1),
- a summation planetary gear set (5) having a ring gear (8) and at least one sun gear (7, 21, 22),
- the summation planetary gear set (5) having a double planetary gear (6),
- an axis of rotation of the sun gear (7, 21, 22) being spaced from an axis of rotation of the input shaft (2),
- an infinitely adjustable variator (10) having a first shaft (9) and a second shaft (11),
- the first shaft (9) being connected, in a rotationally fixed manner, to the sun gear (7, 21),
- the second shaft (11) being connected, in a rotationally fixed manner to a spur gear (12), and being operatively connected to the ring gear (8) via the spur gear (12),
- the sun gear (7, 22) being connectable to an output shaft (16) via at least a first shift element (18), and
- the ring gear (8) being connectable to the output shaft (16) via direct connection to at least a second shift element (13).

13. The power-branched transmission according to claim 12, wherein the spur gear (12) directly rotationally engages the ring gear (8).

14. The power-branched transmission according to claim 12, wherein the summation planetary gear set (5) has only one ring gear (8).

15. The power-branched transmission according to claim 12, wherein the first shaft (9) and the sun gear (7, 21, 22) are both directly connected, in a rotationally fixed manner, to the first shift element (18).

16. The power-branched transmission according to claim 12, wherein the ring gear (8) is directly connected, in a rotationally fixed manner, to the second shift element (13).

17. The power-branched transmission according to claim 12 wherein the power-branched transmission comprises a secondary coupling.

* * * * *